United States Patent [19]

Dieffenbacher et al.

[11] 4,017,248

[45] Apr. 12, 1977

[54] CONTINUOUSLY OPERATING PANEL PRESS

[75] Inventors: Gerhard Dieffenbacher; Heinrich Pfeiffer, both of Eppingen, Germany

[73] Assignee: Maschinenfabrik J. Dieffenbacher & Co., Eppingen, Germany

[22] Filed: Jan. 31, 1975

[21] Appl. No.: 546,014

[30] Foreign Application Priority Data

Jan. 31, 1974 Germany .......................... 2404523

[52] U.S. Cl. .............................. 425/371; 264/40.1; 264/165; 425/335; 425/149; 100/151

[51] Int. Cl.$^2$ ........................................... B29C 3/06

[58] Field of Search .......... 425/363, 367, 335, 371, 425/372, 394, 146, 149, 169, 170; 264/165, 40; 100/151

[56] References Cited

UNITED STATES PATENTS

| | | | |
|---|---|---|---|
| 3,364,519 | 1/1968 | Pitsch | 425/DIG. 235 |
| 3,600,747 | 7/1971 | McCarty | 425/170 |
| 3,852,012 | 12/1974 | Pfeiffer | 425/363 |
| 3,887,318 | 6/1975 | DeMets | 425/371 |

*Primary Examiner*—Robert L. Spicer, Jr.
*Attorney, Agent, or Firm*—Joseph A. Geiger

[57] ABSTRACT

A continuously operating panel press having a series of separately adjustable heater pads and two pairs of likewise adjustable pressure rollers with intermediate pressure pads, the pressures being adjusted for a progressively decreasing pressure pattern along the work gap, a first zone being adjusted for high pressure while successive zones exert less pressure against the press work, as it is pulled through the press by means of endless band conveyors. When excessive resistance is encountered, the highest pressure is alternatingly shifted from rollers to pads and vice versa, while the other pressures are briefly relaxed.

8 Claims, 2 Drawing Figures

CONTINUOUSLY OPERATING PANEL PRESS

BACKGROUND OF THE INVENTION

1. Field of the Invention

The present invention relates to presses for the fabrication of panels of pressed chips, of pressed fibers, or of plywood and the like, and it relates in particular to continuously operating panel presses having cooperating upper and lower endless conveyor bands moving through an adjustable work gap between a press table and a vertically movable upper press spar.

2. Description of the Prior Art

A known panel press of the type mentioned is described in co-inventor Heinrich Pfeiffer's U.S. Pat. No. 3,852,012. It features an open machine frame with horizontally extending upper and lower fixed supports carrying between them an upper, movable press spar and a lower, stationary press spar or press table. The two elongated press spars carry each a conveyor with a flat endless conveyor band running between a drive drum and a reversing drum mounted on the extremities of the press spars. The lower strand of the upper conveyor and the upper strand of the lower conveyor define between them a continuously moving work gap in which the press work—a stack of panels, or layers of raw material and adhesive—is compressed and cured under the application of heat.

In general, the production of chipboard panel, fiber panels, plywood panels, plastic multi-layer panels and the like, but also the application of linings, require the use of high pressure as well as high heat, if the quality standards of high uniformity and resistance are to be consistently met. Some presently known single-level heater pad presses of the intermittently operating type do achieve these quality standards, but their personnel requirements are high and their productivity is obviously limited by the need to proceed by intermittent operating steps.

This shortcoming is overcome with the conveyor-equipped, continuously operating panel press described above, where the press work is continuously advanced by means of the conveyor bands, while heat and pressure are applied to it. Such a press is capable of producing, for instance, a continuous finished chipboard panel of high quality with a minimum of cutting waste. However, the continuously operating panel press has a major limitation, inasmuch as the required pressure creates considerable frictional resistance between the advancing steel bands of the conveyors and the cooperating supporting surfaces on the upper press spar and on the press table. The maximum permissible pressure is thus limited by the tensile strength of the steel bands and/or by the friction drive conditions between the conveyor drive drums and the steel bands. And because the narrowing work gap is essentially fixed for a given run, it is the advancing steel bands that actually have to create the pressure against them. These bands, however, have manufacture and design related limitations to their gauge, so as to in turn limit the maximum applicable pressure against the press work.

Another important operative parameter is the duration of compression, during which time the adhesives in the work are to be cured. This factor, in conjunction with the amount of heat that has to be transferred to the press work, determines the necessary length of the panel press. The length of the work gap thus becomes a crucial feature of this type of press. The longer this gap, the more heat can be transferred to the work, but a longer gap means a lower specific pressure per unit area in the work gap, given the same overall pressure between the press spars. A lower specific pressure, on the other hand, affects the density and the overall quality of the finished product adversely. The optimal length of the work gap must therefore be a compromise between the desire for a high specific pressure, which calls for a short press gap, and a high heat input which is favored by a long gap.

An additional problem encountered with continuously operating presses, especially in connection with the production of chipboard panels, relates to the occurrence of fluctuations and irregularities in the chip layer, when deposited, so that it becomes necessary to reduce the conveyor traction, and with it the work pressure, in order to avoid the risk that the conveyor bands either break or slip on the drive drums.

It has already been suggested to modify the continuously operating panel press for higher work pressure, by using balls or rollers, or even roller chains, which either travel with the endless bands, or are arranged stationarily behind the steel bands. But, even these measures have failed to achieve the high degree of compression and uniformity which is necessary for an economic production of chipboard panels. While a higher compression is indeed achieved this way, the heat transfer is now poorer and the conveyor bands are subjected to higher stress and strain, because of the accentuated point or line pressures on the bands. The result is not only a greatly increased wear on the steel bands, but also a deterioration of the product quality, whose surface is no longer perfectly flat and even. Lastly, this modified continuously operating panel press is complex in structure and costly to build and predictably, subject to considerable downtime due to malfunction.

It has heretofore not been possible, in any of the known continuous panel pressing installations, to independently control the work pressure, by adjusting it as a function of the curing process inside the press work, in the manner in which this is possible with known intermittently operating single-level or multi-level panel presses, where no conveyors are used. Such attempts tend to greatly increase the friction against the steel bands to an unacceptable level.

SUMMARY OF THE INVENTION

Underlying the present invention is the primary objective of improving upon known continuously operating panel presses in such a way that a longer gap and/or a higher specific pressure is achievable, while the pressure in various length sections of the work gap is independently and accurately controllable, in accordance with a particular panel pressing program. A companion objective to such a stepped, controllable pressure pattern is the maintenance of a high heat transfer rate, while any slippage of the endless steel bands on their drive drums is to be avoided.

The present invention proposes to attain these objectives by suggesting a continuously operating panel press in which the heater pads are subdivided longitudinally and their distance to the supporting press spar is independently adjustable, while one or more gaps are provided between the heater pad sections for the accomodation of pairs of pressure rollers which bear against the moving conveyor bands. For this purpose, it is suggested that separate pressure cylinders are provided for the various heater pad sections, as well as for the pressure rollers, and that, in the event that the counter pressure from the press work fluctuates, especially when it rises unexpectedly, the maximum pressure exerted against the work can be alternatingly shifted back and forth between the spars and the pressure rollers, by accordingly increasing and decreasing the pressurization of the various hydraulic adjusting cylinders, through appropriate control devices. This "pumping" approach makes it possible to fully utilize the tensile strength of the conveyor members which, as stated, are preferably steel bands, meaning that a higher overall work pressure is achievable, especially where this is most important, namely in the initial compression zone of the work gap. It is especially through very short pressure relaxations that the previously encountered slippage and tensile failure of the steel bands is now being prevented. The alternating mode of cylinder pressurization brings with it a considerable reduction in the sliding friction, when the work pressure is momentarily shifted to the pressure rollers, where the lesser rolling friction allows the endless bands to regain both their grip on the drive drums and their movement momentum between the heater pads, before the latter are again lowered against the work gap.

By further suggesting that the work gap length be subdivided into independent heater pad sections, in accordance with the particular requirements of the curing process, and, where advantageous, by using different temperature levels on these heater pads, the invention makes it possible to use only that level of pressure which is required in each of several successive zones, so that, even though the maximum specific pressure achieved may be higher, the overall load on the press spars, and consequently the frictional resistance on the conveyors, is in fact reduced. The possibility of thus independently choosing the duration of maximum pressure application and the timing and duration of heat application was found to represent a great improvement over prior art panel presses of this type. The work gap can now be made longer, for greater heat input for better curing, without the drawback of a corresponding increase in friction. While this improved press produces panels of better quality, due to the higher pressures used, it can also be run faster, for greater productivity, because of the greater press length.

In a preferred embodiment of the invention the successive pressure zones along the work gap are zones of progressively decreasing pressure, the adjusting cylinders of the movable press spar, of the heater pads, and of the pressure rollers being pressurized progressively less, as their distance from the press feed end increases. The invention thus offers the possibility of carefully adapting the panel pressing operation to the particular material characteristics of the press work, by subdividing the length of the work gap into an initial compression zone, a subsequent polymerization zone, and a final equalization zone. The pressure exerted against the work is highest in the compression zone, meaning that the press spar cylinders at the forward end of the press must exert more downward pressure than those on the rear end. The individual adjusting cylinders of the pressure rollers and of the heater pads are similarly set for decreasing pressure toward the rear end of the work gap.

In a further development of the invention it is suggested to provide pressure measuring means on the heater pads for the determination of the counter-pressure exerted by the chip layer or other press work. For this purpose, it is possible, for example, to utilize pressure readings in the adjusting cylinders of the upper press spar or pressure readings in the cylinders of the heater pads and/or of the pressure rollers.

The pressure readings obtained in this way can be advantageously converted into control pulses for the creation of brief, alternating pressure surges and pressure relaxations in the adjusting cylinders of the upper spar, heater pads and pressure rollers, so that the conveyor bands are not overstressed and accidental tensile failure of the bands is avoided. The same control pulses may also be advantageously utilized to control the height of the chip cake which is continuously deposited on the press table, thereby accurately controlling the thickness of the finished chipboard panel.

According to a further proposal of the invention, it is suggested to provide measuring means for monitoring the slippage of the endless bands on their drive drums, as a reading on the resistance encountered, and hence on the pressure in the work gap, the slippage readings being similarly exploitable for initiating the earlier-mentioned pulsating pressure surges and relaxations and/or the rate at which raw material is fed into the press. The resultant preventation of lasting slippage on the drive drums protects the bands and assures uniform product quality, while making it possible to fully utilize the conveyor pulling capacity. The preferred embodiment of the invention, by aiming for a sensitive and differentiated adjustability of the work pressures against the moving conveyor bands, proposes an adjustment cylinder arrangement for the pressure rollers and heater pads in which some of the cylinders are supported in the press frame itself, and others are supported in the upper press spar, while the opposing cylinders of the lower pressure rollers are supported in the lower press spar, i.e. the press table.

Another advantageous feature of the invention relates to the suggestion of adjusting a work gap between the pressure roller pairs which is several tenths of a millimeter smaller in height than the gap between the heater pads. The highest compression is thus exerted by the pressure rollers, with a minimum of frictional resistance against the conveyor bands, because the latter is of the rolling rather than the sliding type. When two or more pairs of pressure rollers are utilized, it is further suggested to provide between them short heater pads that are likewise connected to individual pressure cylinders which respond to the induced alternating pressure fluctuations, when a surge in conveyor resistance is encountered.

The highest permissible pull on the endless bands and the heat input into the press work can be increased still further, when the pressure rollers are heated and driven in synchronism with the speed of the conveyor bands. The result is not only an increase in traction on the conveyor bands, but also an improved heat input. This permits either an increase in the press length for a higher speed of conveyor advance, or an overall increase in the working pressure, for higher product quality.

Lastly, the invention suggests that the conveyor drive be so designed that slippage on the drive drum takes place before the endless bands are stressed to their point of tensile failure. As sources for the derivation of the pressure and resistance control readings may be used the already mentioned pressures in the adjusting cylinders, the energy consumption rate of the conveyor drive motors, and/or a special support arrangement for the drive drums in which the tensioning mechanism for the endless bands provides the readings.

BRIEF DESCRIPTION OF THE DRAWINGS

Further special features and advantages of the present invention will become apparent from the description following below, when taken together with the accompanying drawings, which illustrate, by way of example, an embodiment of the invention, represented as the various figures as follows.

DESCRIPTION OF THE PREFERRED EMBODIMENT

Figure 1:
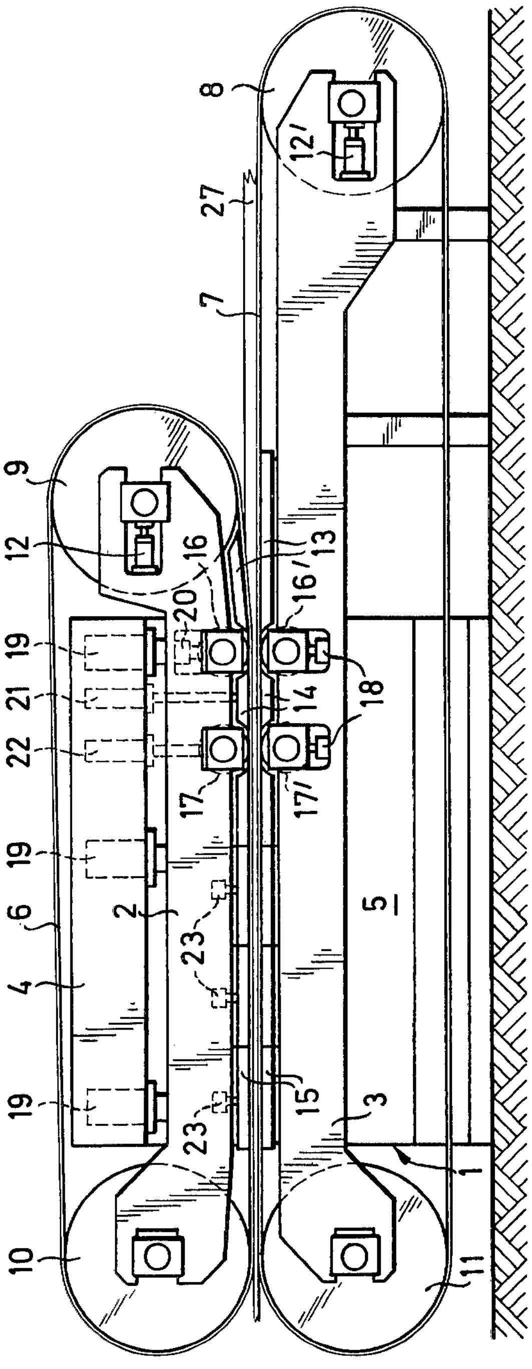
FIG. 1 shows in a somewhat schematic elevational view a continuously operating panel press embodying the invention.
Figure 2:
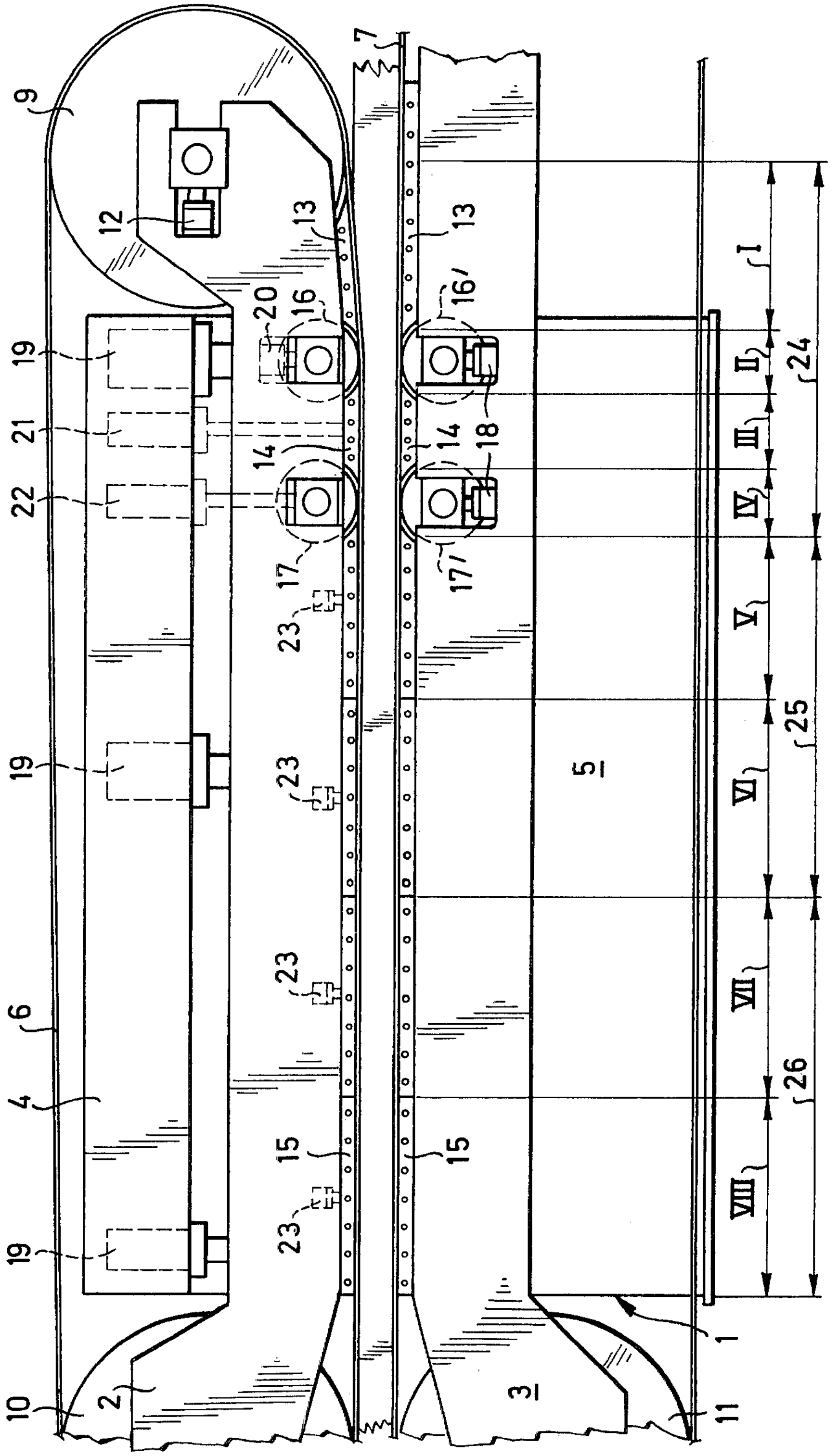
FIG. 2 shows at an enlarged scale a portion of the press of FIG. 1.

As illustrated in FIG. 1 and in FIG. 2, the preferred embodiment of the invention consists of a press frame 1, from whose vertical frame portion extend two vertically spaced horizontal cantilever supports 4 and 5. A similarly constructed press frame is disclosed in more detail in the earlier-mentioned U.S. Pat. No. 3,852,012. Mounted underneath the upper support 4 is a vertically movable upper press spar 2, while a similar lower press spar or press table 3 is fixedly mounted above the lower support 5. The lower press spar or table 3 carries a conveyor consisting of an endless belt 7 which runs from a reversing drum 8, mounted on the forward extremity of the spar, to a drive drum 11 on its rear extremity, the upper strand of the endless band 7 being slidingly supported on the upper side of table 3. The tension of the band 7 is adjustable by means of hydraulic cylinders 12′ engaging adjustable journals of the reversing drum 8. A similar conveyor surrounds the upper spar 2, the conveyor consisting of an endless belt 6, running parallel to belt 7 below the upper press spar 2, a front reversing drum 9, and a rear drive drum 10 with hydraulic adjusting cylinders 12.

The lower conveyor extends forward a distance beyond the upper conveyor, as illustrated in FIG. 1, in order to provide a convenient in-feed surface onto which the panel raw materials or semi-finished press work 27 can be continuously deposited. From here, the press work is advanced into the work gap, which is defined by the distance between the upper strand of belt 7 and the lower strand of belt 6. The length of this work gap is essentially identical to the length of the upper and lower supports 4 and 5. The height of the work gap is adjustable by raising or lowering the upper press spar 2, whose position relative to its support 4 is determined by a series of hydraulic spar positioning cylinders 19.

Both spars carry on their surfaces facing the work a series of heater pads 13, 14 and 15, the pads 14 and 15 of the upper spar 2 being vertically adjustable relative to the spar 2 by means of individual hydraulic pad adjusting cylinders 21 and 23, respectively, all other pads being non-adjustably attached to the respective press spars. Each of the two spars of the panel press is further equipped with a pair of independently adjustable pressure rollers 16 and 17, and 16′ and 17′, respectivly. The upper heater pads 15 and the roller 16 are shown to be supported against the spar 2, by means of hydraulic adjusting cylinders 23 and 20, respectively, while the upper heater pad 14 and the roller 17 are supported against the stationary upper support 4, by means of adjusting cylinders 21 and 22, respectively. It should be understood that the adjustable supports could also engage both the spar 2 and the support 4, in order to still further increase the vertical adjustment sensitivity of the arrangement. Depending upon the production requirements, it is thus possible to make corrective adjustments either in opposition to the upper press spar 2, by pressurizing the adjustment cylinders 18, 20 and 23, or to make adjustments which reinforce the total pressure exerted by the upper spar 2, by pressurizing the adjustment cylinders 21 and 22.

Lastly, the spar positioning cylinders 19 may be of unequal size, as shown in FIG. 2, for instance, where the forward cylinders are larger in diameter than the rear cylinder. In this fashion, it becomes possible to obtain a finely adjustable, progressively decreasing pressure pattern along the work gap, as the press work 27 passes through it from front to rear.

The overall length of the work gap can thus be conveniently subdivided into eight adjustment zones, designated by roman numerals I through VIII, where the pressure against the work is independently adjustable, in accordance with the specific characteristics of the materials used and as the curing conditions of the adhesives may require. The first four adjustment zones I–IV, in which the pressure is built up and held to a maximum value, may thus be referred to collectively as a compression zone 24; the next-following adjustment zones V and VI, with a reduced pressure against the work 27, would constitute the polymerization zone 25; and the last two adjustment zones VII and VIII represent an equalization zone 26.

While it is necessary in the compression zone 24 to apply both maximum pressure and maximum heat input to the entering press work 27, only a medium level of pressure, with a continued high heat input, is necessary in the polymerization zone 25. The equalization zone 26, however, requires only a minimal pressure, which only needs to exceed the vapor pressure inside the press work, while a continued moderate heat input completes the curing process in the work. In a case where the pressure roller pairs 16, 16′ and 17, 17′ are to be adjusted for minimal gap height, it may become advantageous to also make the short intermediate heater pad 14 of the press table 3 vertically adjustable, using adjustment cylinders similar to the cylinders 18 of the lower rollers 16′ and 17′, in order to obtain both the highest possible pressure and a maximum rate of heat input to the press work 27.

It should be understood, of course, that the foregoing disclosure describes only a preferred embodiment of the invention and that it is intended to cover all changes and modifications of this example of the invention which fall within the scope of the appended claims.

We claim the following:

1. In a continuously operating panel press for the fabrication of pressed panels, such as chipboard panels, fiber panels, plywood panels, and the like, where a press frame carries an upper, vertically adjustable elongated press spar on an upper support, and a lower fixed elongated spar or press table on a lower support; and where each press spar is equipped with a horizontal conveyor comprising an endless conveyor band running from a reversing drum on the front end of the spar to a drive drum on the rear end of the spar so as to define a work gap between the two bands; and further where the continuously advancing conveyor bands on opposite sides of the work gap carry between them the press work which is to become a finished pressed panel, as pressure and heat are applied to the press work, via the moving bands, by heater pads that are arranged behind the bands and supported by the upper and lower press spars, respectively; in such a press, the improved combination comprising:

a heater pad arrangement on the upper press spar which features a plurality of longitudinally adjacent sectional heater pads which are independently supported on the press spar so as to be vertically adjustable in relation thereto;

hydraulic cylinder means connected to the vertically adjustable sectional heater pads individually for varying their relative position and pressure against the press work between the advancing conveyor bands;

at least one pair of cooperating pressure rollers arranged near the front end of the work gap and mounted on said upper and lower press spars, respectively, in a location in which the rollers are longitudinally adjacent to heater pads, the rollers bearing against the advancing bands in the sense of applying pressure against the press work, the pressure transmitting peripheries of the rollers being spaced a small amount closer than the adjacent heater pads which likewise bear against said bands, and at least the upper one of said rollers being vertically adjustable; and hydraulic cylinder means for vertically adjusting said roller, thereby varying the pressure exerted by the roller pair against the press work between the advancing conveyor bands, and wherein the hydraulic cylinder means associated with said adjustable heater pads and the hydraulic cylinder means associated with said roller pair are independently operable, so as to allow for a continuous variation of the ratio between the sliding friction which is created between the heater pads and the conveyor bands and the rolling friction which is created between the pressure rollers and the conveyor bands.

2. A panel press improvement as defined in claim 1, wherein the improved combination further comprises:

a second pair of cooperating pressure rollers spaced a distance behind the first-mentioned pair of rollers; and an upper and a lower intermediate heater pad arranged between the two pairs of rollers; and wherein at least the upper intermediate heater pad is vertically adjustable and includes hydraulic cylinder means for varying its pressure against the press work.

3. A panel press improvement as defined in claim 2, wherein:

the hydraulic cylinder means for those heater pads which are arranged behind the pressure rollers are anchored on the vertically movable press spar;

the hydraulic cylinder means for the upper intermediate heater pad is anchored on the upper support of the press frame which carries the vertically movable press spar; and the vertically movable upper press spar itself includes hydraulic cylinder means for vertically varying its position in relation to said upper support.

4. A panel press improvement as defined in claim 2, wherein the two pairs of pressure rollers are adjusted for a gap which is several tenths of a millimeter smaller than the gap adjusted between the immediately adjacent heater pads.

5. A panel press improvement as defined in claim 1, wherein said measuring means is a gauge measuring the energy consumption of the conveyor drive, which consumption is an indication of the conveyor band resistance, and hence of the work pressure.

6. A panel press improvement as defined in claim 1, wherein:

the vertically movable upper press spar includes hydraulic cylinder means for vertically positioning it in relation to the press frame support on which it is mounted; and the hydraulic cylinder means associated with the heater pads, pressure rollers, and upper press spar, respectively, are so coordinated that the overall pressure which they exert against the advancing bands and against the press work between the latter progressively decreases from the front to the rear of the work gap.

7. A panel press improvement as defined in claim 1, wherein both endless conveyors have their reversing drums supported in longitudinally adjustable journals, with hydraulically actuated positioning means for adjusting said journals, the positioning means being set for a predetermined tension limit on the endless bands, so that, when a certain traction is exceeded on a band, the latter will slip on the drive drum, rather than break under the excessive tension.

8. A method of controlling the work pressure in a continuously operating panel press for the fabrication of pressed panels, especially of chipboard panels or fiber panels for which the raw materials are continuously deposited on a receiving conveyor surface of the panel press; where the panel press is equipped with two horizontally parallel-running endless conveyor bands and drums defining a press work carrying work gap between said bands, while heat and pressure are applied to the bands by means of a succession of independently vertically movable heater pads engaging the conveyor bands and by means of opposing, likewise vertically movable pressure rollers engaging the conveyor bands adjacent to the heater pads; and where hydraulic cylinder means for vertical pressure adjustment are provided on at least the upper heater pads and pressure rollers; the method comprising the steps of:

continuously monitoring the conveyor traction created by the frictional resistance encountered by the conveyor bands against the heater pads and against the pressure rollers of the press, as reflected by the bearing loads on the conveyor drums; and "pumping" the hydraulic adjustment means of the heater pads and of the pressure rollers, respectively, by momentarily and alternatingly increasing the pressure on the pressure rollers while relaxing the pressure on the heater pads, and vice versa, thereby temporarily decreasing the sliding friction and increasing the rolling friction on the conveyor bands, in order to avoid slippage on the drums.

* * * * *